Nov. 3, 1959  F. D. GREENLEAF ET AL  2,911,470
OSCILLATING OPTICAL SCANNER
Filed April 28, 1954
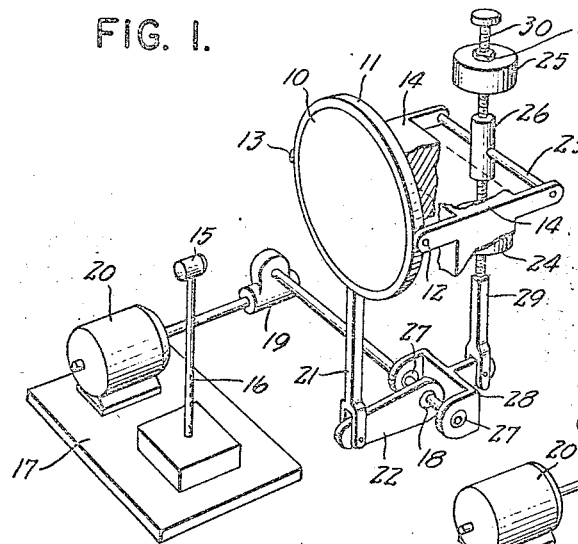
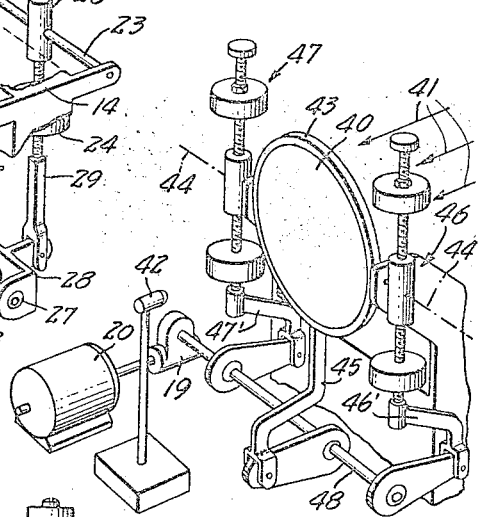
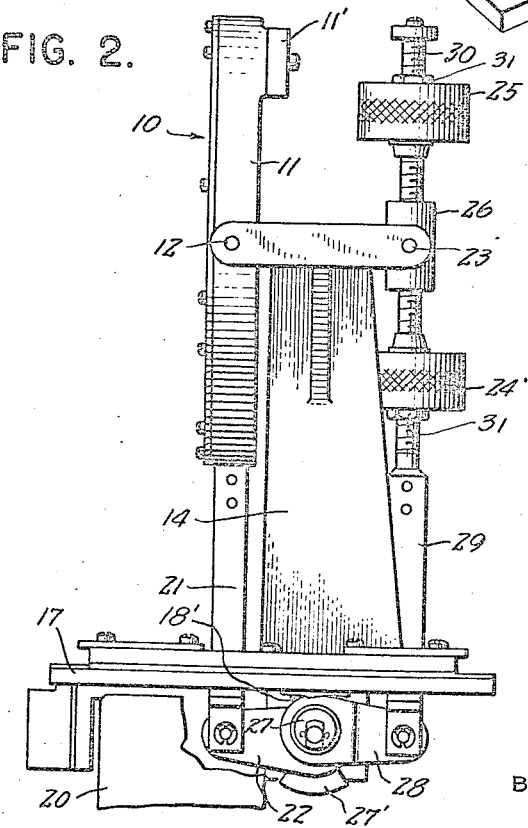
INVENTORS
FRANCIS D. GREENLEAF
RONALD F. MEYER
LUIS F. VILLAR
ATTORNEYS 2,911,470

OSCILLATING OPTICAL SCANNER

Francis D. Greenleaf, Syosset, Ronald F. Meyer, New York, and Luis F. Villar, Westbury, N.Y., assignors to Servo Corporation of America, New Hyde Park, N.Y., a corporation of New York Application April 28, 1954, Serial No. 426,218

13 Claims. (Cl. 178—7.6)

Our invention relates to optical-scanning means of the type in which a field of view is periodically scanned by optics including a tilting mirror.

It is an object of the invention to provide improved means of the character indicated.

It is another object to apply oscillating tilt motion to a scanning mirror without introducing mechanical vibrations and without affecting the accuracy of optics including such mirror.

It is a further object to provide means for substantially eliminating any tendency to generate mechanical vibration in the oscillating-tilt mechanism for a scanning mirror or other optical element.

Other objects and various further features of the invention will be pointed out or will occur to those skilled in the art from a reading of the following specification, in conjunction with the accompanying drawings. In said drawings, which show, for illustrative purposes only, preferred forms of the invention:

Fig. 1 is a fragmentary, simplified, perspective view of a scanning mechanism incorporating features of the invention;

Fig. 2 is a detailed side elevation of our mechanism; and

Fig. 3 is a view similar to Fig. 1 but illustrating a modification.

Briefly stated, our invention contemplates neutralizing mechanical vibration in an optical-scanning mechanism in which an optical element, such as a lens or a mirror, which may be a heavy mirror-surfaced glass blank, is periodically tilted or oscillated about an axis transverse to the optical axis. The vibration is very substantially eliminated by providing counterweight means suspended about a tilt axis spaced from and substantially parallel to the mirror-tilt axis. Both the mirror (or lens) and the counterweight are supported on their respective tilt axes with substantially equal moments of inertia on opposite sides of their said respective tilt axes, and the moments of inertia of both the mirror (or lens) and the counterweight are preferably the same. Equal and opposite tilt motions are applied simultaneously to the mirror (or lens) and to the counterweight through means inherently causing no mechanical reaction against the frame or mounting means.

Referring to Figs. 1 and 2 of the drawings, our invention is shown in application to an optical-scanning mechanism employing mirror means 10 which may be a heavy glass blank, provided with a reflecting surface, and set in a suitable supporting frame 11 for tilt about an axis provided by bearings 12—13. The tilt axis extends transversely to the optical axis and may be fixedly located by suspension from frame means 14. The mirror 10 may collect incident radiant energy (from the lower left as viewed in the sense of Fig. 1) and may focus the same on fixed energy-responsive means 15, such as a photoelectric or infrared-responsive cell. The cell 15 is shown supported on a standard 16 rigidly attached to frame means 17, fixed with reference to frame means 14.

Oscillating motion may be applied to mirror 10 about the tilt axis 12—13 by means of a continuously driven mechanism, employing an eccentric 18 connected by a reduction gear 19 to motor 20. The eccentric 18 is shown spaced substantially away from the tilt axis 12—13 so that a relatively small scanning angle may be generated, and it will be understood that for larger scanning angles the eccentric 18 may be closer to the tilt axis. Because of the small scanning angle in the form shown, the mirror frame 11 includes an elongated tilt arm 21 connected to the eccentric follower 22. Additional mass 11' (see Fig. 2) is preferably secured to the mirror frame 11 on the opposite side of the tilt axis 12—13, so that equal moments of inertia characterize the overall mass on each side of axis 12—13.

In accordance with the invention, we avoid the mechanical vibrations which inherently result from frame reaction occasioned by the oscillation of the relatively large mass or mirror 10, particularly at high speed. This is accomplished by oscillating a duplicate system of masses corresponding, as far as possible, to those characteristic of mirror 10 and of its associated oscillating structure. As far as possible, we attempt, in all respects, to duplicate the reacting oscillating structures so that no net reaction results on the frame. Thus, a counterweight tilt axis 23 is established on frame means 14 close to and generally parallel to the tilt axis 12—13 for the mirror 10. The counterweight is preferably characterized by two opposed masses 24—25 spaced by supporting structure 26 on opposite sides of the axis 23 such that the overall moment of inertia on one side of the axis 23 substantially equals that on the other side of the axis 23. The drive to the counterweight preferably also duplicates that to the mirror, except, of course, that the eccentric means 27 for driving the counterweight is in opposed-phase relation with the eccentric 18 for driving the mirror. Thus, the eccentric follower 28 may effectively duplicate the follower 22, and the connection of arm 29 to follower 28 may be offset from the tilt axis 23 to the same extent as the connection from follower 22 to the arm 21 is offset from the tilt axis 12—13; in the form shown, differentially-applied thrusts exerted by eccentrics 18—27 are derived from a common shaft, with arm 28 forked and following duplicate eccentrics 27 on opposite sides of eccentric 18. The masses of follower arms 22—28 are preferably the same so as to avoid vibration due to a symmetry of eccentrically gyrated masses. Further, counterweight means 18'—27' may be carried for rotation with the eccentrics to offset frame reaction due to eccentric-displacement components in the general plane normal to thrusts used to cause tilting, as will be understood.

In operation, the mirror 10 and the counterweight 24-25 will oscillate in opposed relation in such manner that no reaction force is applied to the frame. Since there is no reaction on the frame, there is no resultant frame vibration and, therefore, no mechanical-noise reaction appears in the electrical output of a highly sensitive cell 15. While it is desired to locate the tilt-axis centers for the mirror assembly and for the counterweight assembly such that moments of inertia are equal on opposite sides of the respective tilt axes, this may not always be completely predictable because of slight deviations from design specifications. For this reason, we shown the counterweight masses 24—35 adjustably positioned on threaded parts, as at 30, of the supporting structure 26, and secured by lock nuts 31. We have found that with proper positioning adjustment of these masses 24—25, frame reaction is completely eliminated, even under conditions of high-speed oscillation.

In Fig. 3, we illustrate a modification lending itself particularly to scanning refractive optics, such as an oscillating lens 40, accepting incident radiation from the direction 41 for focus on cell 42. Lens 40 may be supported in a frame 43 on a frame-based tilt axis 44 and with a depending actuating arm 45. In order that the counterweight means shall not block the passage of radiation through the optics, the counterweight means is disposed on opposite sides of optical element 40. Thus, two like counterweight systems 46—47, resembling means 24—25—26 of Fig. 1, but each of one half the mass and moment of inertia of assembly 40—43, may be carried on the same tilt axis 44 as frame 43. Each counterweight may have its own actuating arm 46'—47', and all three arms 45—46'—47' may be separately driven by eccentrics on a common drive shaft 48. Of course, the eccentrics driving arms 46'—47' are in phase with each other, but are in opposed-phase relation with the eccentric driving arm 45.

Operation of the device of Fig. 3 will be inherently vibrationless for the same reason as discussed for Figs. 1 and 2. At the same time, fully open access is available for all ray bundles of the optical system. The invention is thus equally applicable to oscillating optical elements, whether of the reflecting or of the refracting variety.

While we have described our invention in detail for the preferred forms shown, it will be understood that modifications may be made within the scope of the invention, as defined in the appended claims.

We claim:

1. Optical-scanning means, comprising a focusing mirror mounted for tilt about an axis transverse to its optical axis, counterweight means having an axis of tilt spaced from and generally parallel to the tilt axis of said mirror, said mirror being supported about its tilt axis with substantially equal moments of inertia on opposite sides of the tilt axis thereof and said counterweight means being supported about its tilt axis with substantially equal moments of inertia on opposite sides of the tilt axis thereof, the respective moments of inertia of said mirror and of said counterweight means about their respective tilt axes being substantially the same, and means for simultaneously applying oscillating motion of equal magnitude directly to said mirror and directly to said counterweight means about said tilt axes and in opposed-phase relation.

2. Optical-scanning means, comprising a focusing mirror mounted for tilt about an axis transverse to its optical axis, said tilt axis being so located as to provide substantially equal moments of inertia on both sides of said tilt axis, counterweight means having an axis of tilt spaced from and substantially parallel to that of said mirror, said counterweight means having substantially equal moments of inertia on opposite sides of the tilt axis thereof, and means for simultaneously applying oscillating motion of equal magnitude to said mirror and to said counterweight means about the tilt axes and in opposed-phase relation.

3. Optical-scanning means, comprising a central frame member with tilt-bearing means on opposite sides thereof and on parallel axes, a mirror supported for oscillating tilt in the bearing means on one of said axes, a counterweight supported for oscillating tilt in the bearing means on the other of said axes and having masses on opposite sides of the tilt axis thereof substantially duplicating the masses on opposite sides of the tilt axis of said mirror, and means for simultaneously applying oscillating motion to said mirror and to said counterweight means about their respective tilt axes and in opposed-phase relation.

4. Scanning means according to claim 3, in which said last-defined means comprises continuously driven eccentrics on a common shaft between said mirror and said counterweight and offset to one side of said tilt axes.

5. Optical-scanning means, comprising a mirror and a counterweight, tilt-axis supporting means for said mirror and for said counterweight, said mirror being supported about its pivot axis with substantially equal moments of inertia on opposite sides of the tilt axis thereof and said counterweight being supported about its pivot axis with substantially equal moments of intertia on opposite sides of the tilt axis thereof, said mirror and said counterweight having substantially equal moments of inertia about their respective tilt axes, and differential-actuating means for tilting said mirror and said counterweight, said differential-actuating means being offset from said tilt axes and symmetrically located with respect to said tilt axes.

6. Scanning means according to claim 5, in which said tilt axes are spaced and generally parallel.

7. Scanning means, comprising fixed energy-responsive means, optics focused on said means and including an optical element pivotally supported on a tilt axis with substantially equal moments of inertia on opposite sides thereof, a counterweight pivotally supported on a tilt axis with substantially equal moments of inertia on opposite sides thereof, and means differentially actuating said element and said counterweight in oscillation of equal magnitude and opposite phase about their respective tilt axes.

8. Scanning means according to claim 7, in which said counterweight tilt axis and said optics tilt axis are coincident.

9. Scanning means according to claim 7, in which said counterweight comprises two like halves mounted on said counterweight tilt axis but on opposite lateral sides of said optics.

10. Scanning means according to claim 7, in which said optics includes a tilted reflecting element.

11. Scanning means according to claim 7, in which said optics includes a tilted refractive element.

12. Counterbalanced mechanism, comprising two masses independently mounted on substantially parallel axes, each of said masses being supported about its tilt axis with substantially equal moments of inertia on opposite sides of the tilt axis thereof, and said masses having substantially equal moments of inertia about said axes, and means directly and simultaneously applying oscillating motion to said masses about said axes and in opposed-phase relation.

13. Counterbalanced mechanism, comprising two masses, tilt-axis supporting means for said masses, each of said masses being supported about its tilt axis with substantially equal moments of inertia on opposite sides of the tilt axis thereof, and said masses having substantially equal moments of inertia about said axes, and means directly and simultaneously applying oscillating motion to said masses about their respective tilt axes and in opposed phase relation.

References Cited in the file of this patent

UNITED STATES PATENTS

| | | |
|---|---|---|
| 645,324 | McCune | Mar. 13, 1900 |
| 1,582,674 | Fairgrieve et al. | Apr. 27, 1926 |
| 1,707,583 | Stripling | Apr. 12, 1929 |
| 1,918,358 | Walton | July 18, 1933 |
| 1,973,510 | Schieferstein | Sept. 11, 1934 |
| 1,993,236 | Barney | Mar. 5, 1935 |
| 2,471,687 | Holmes | May 31, 1949 |